United States Patent
Merkle et al.

(10) Patent No.: US 12,326,306 B2
(45) Date of Patent: Jun. 10, 2025

(54) CRIMPING TOOL AND HEAT EXCHANGER MADE WITH CRIMPING TOOL

(71) Applicant: MAHLE INTERNATIONAL GMBH, Stuttgart (DE)

(72) Inventors: Christian Merkle, Burgstetten (DE); Frank Nastoll, Ostfildern (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 150 days.

(21) Appl. No.: 18/377,384

(22) Filed: Oct. 6, 2023

(65) Prior Publication Data

US 2024/0159478 A1    May 16, 2024

(30) Foreign Application Priority Data

Nov. 15, 2022    (DE) .......................... 102022212148.1

(51) Int. Cl.
| | | |
|---|---|---|
| *F28F 9/02* | (2006.01) | |
| *B21D 39/04* | (2006.01) | |
| *B23P 15/26* | (2006.01) | |
| *B25B 27/02* | (2006.01) | |

(52) U.S. Cl.
CPC .......... *F28F 9/0256* (2013.01); *B21D 39/048* (2013.01); *B23P 15/26* (2013.01); *B25B 27/02* (2013.01); *F28F 2275/122* (2013.01)

(58) Field of Classification Search
CPC ... F28F 9/0256; F28F 2275/122; B23P 15/26; B21D 39/048; B25B 27/02
USPC .......................................................... 165/58
See application file for complete search history.

(56) References Cited

U.S. PATENT DOCUMENTS

| | | | | |
|---|---|---|---|---|
| 2,457,105 A | * | 12/1948 | Patterson ................ | F16L 37/52 285/364 |
| 4,142,843 A | * | 3/1979 | Kish ....................... | F16L 13/16 417/313 |
| 5,151,157 A | * | 9/1992 | le Gauyer ............. | F28F 9/0234 285/382.4 |
| 5,180,005 A | * | 1/1993 | Marsais ................ | F28F 9/0246 285/205 |
| 5,294,156 A | * | 3/1994 | Kumazaki ............... | F25B 41/40 285/415 |
| 5,937,938 A | * | 8/1999 | Makino ................... | F28D 7/106 165/76 |
| 7,188,664 B2 | * | 3/2007 | Fuller ................... | F28F 9/0246 165/140 |
| 7,568,520 B2 | * | 8/2009 | Ozawa .................. | F28F 9/0248 165/178 |
| 8,038,181 B2 | * | 10/2011 | Marschall .............. | F16L 39/00 285/382 |

(Continued)

FOREIGN PATENT DOCUMENTS

| | | |
|---|---|---|
| DE | 868542 | 2/1953 |
| DE | 4204430 | 8/1993 |

(Continued)

*Primary Examiner* — Claire E Rojohn, III
(74) *Attorney, Agent, or Firm* — Barnes & Thornburg LLP

(57) ABSTRACT

The invention relates to a crimping tool for creating at least one connection through which coolant can be conducted between a tube connector and a tube. The invention also relates to a heat exchanger that has the connections formed using the crimping tool. The invention also relates to a method for creating the connections between the tube connectors and the tubes using the crimping tool.

12 Claims, 4 Drawing Sheets

(56) References Cited

U.S. PATENT DOCUMENTS

| | | | | |
|---|---|---|---|---|
| 9,777,878 B2* | 10/2017 | Kesler | | B60H 1/00571 |
| 9,976,821 B2* | 5/2018 | Wolf | | F16L 41/082 |
| 11,149,883 B2* | 10/2021 | Gauss | | F16B 39/08 |
| 11,623,265 B2* | 4/2023 | Khansa | | B21D 39/048 |
| | | | | 72/441 |
| 2003/0080564 A1* | 5/2003 | Izumi | | F16L 41/082 |
| | | | | 285/382 |
| 2003/0234540 A1* | 12/2003 | Igami | | F28F 9/0248 |
| | | | | 285/374 |
| 2004/0036277 A1* | 2/2004 | Inaba | | F28F 9/262 |
| | | | | 285/124.4 |
| 2005/0029806 A1* | 2/2005 | Yamanashi | | F16L 41/086 |
| | | | | 285/205 |
| 2005/0173099 A1* | 8/2005 | Nakajima | | F28D 9/0043 |
| | | | | 165/140 |
| 2006/0225538 A1* | 10/2006 | Brown | | B25B 27/10 |
| | | | | 81/126 |
| 2007/0262617 A1* | 11/2007 | Feith | | B62D 25/145 |
| | | | | 296/205 |
| 2007/0298654 A1* | 12/2007 | Holliday | | B21D 39/048 |
| | | | | 439/578 |
| 2008/0216548 A1* | 9/2008 | Steiner | | B25B 7/12 |
| | | | | 72/409.12 |
| 2010/0107393 A1* | 5/2010 | Vernasca | | B21D 39/048 |
| | | | | 29/237 |
| 2017/0105753 A1* | 4/2017 | Conlon | | B25B 27/02 |
| 2023/0060846 A1* | 3/2023 | Westerby | | B25B 27/10 |
| 2023/0120099 A1* | 4/2023 | LeFavour, Jr. | | B25B 27/10 |
| | | | | 173/216 |
| 2023/0405779 A1* | 12/2023 | Schmid | | B21D 39/048 |
| 2023/0415313 A1* | 12/2023 | Knyrim | | F16H 25/20 |
| 2024/0159478 A1* | 5/2024 | Merkle | | B23P 15/26 |
| 2024/0238943 A1* | 7/2024 | Tretow | | B25B 27/10 |
| 2025/0050479 A1* | 2/2025 | Jensen | | B25B 27/026 |

FOREIGN PATENT DOCUMENTS

| | | |
|---|---|---|
| DE | 10248986 | 5/2003 |
| EP | 0412626 | 2/1991 |
| EP | 2896863 | 7/2015 |
| JP | 2001027495 | 1/2001 |

* cited by examiner

CRIMPING TOOL AND HEAT EXCHANGER MADE WITH CRIMPING TOOL

CROSS-REFERENCE TO RELATED APPLICATIONS

This application claims priority from German Patent Application No. DE 10 2022 212 148.1 filed Nov. 15, 2022, the entirety of which is hereby fully incorporated by reference herein.

The invention relates to a crimping tool with which at least one connection is made between a tube and a tube connector through which coolant is conducted, preferably a tube connector for a heat exchanger. The invention also relates to a heat exchanger that has the connection created with the crimping tool. The invention also relates to a method for creating the connection between the tube and the tube connector using the crimping tool.

A heat exchanger for a motor vehicle normally comprises a heat exchanger block containing numerous coolant channels and two tube connectors connected to the channels through which coolant is conducted, and two tubes that are permanently connected to these tube connectors for conducting coolant. The respective tubes and tube connectors are normally firmly connected to one another mechanically in that there are numerous crimps on the tube connector where the tube is attached to it.

EP 0 412 626 A1, DE 102 48 986 A1, and JP 2001 027 495 A disclose connections of this type between a tube connector and a tube.

The crimps are obtained with a crimping tool in that numerous crimping teeth on the crimping tool are moved radially toward and away from the tube connector in relation to the central longitudinal axis thereof. This unfortunately requires a great deal of free room around the tube connector when creating the crimp. This can pose problems when crimping two adjacent tube connectors on the heat exchanger.

The object of the invention is therefore to create a better, or at least alternative, crimping tool design with which at least one connection can be created, preferably on a heat exchanger, that resolves the disadvantages described above. It is also the object of the invention to create a heat exchanger with the at least one connection obtained with the crimping tool, and a method for obtaining the at least one connection.

These problems are solved by the invention with the subject matter of the independent claims. Advantageous embodiments are the subject matter of the dependent claims.

The present invention is based on the general idea that the crimping teeth in the crimping tool for creating the crimps on the tube connectors on the heat exchanger can move parallel to one another in order to reduce the amount of free room needed around the tube connector, such that crimps can be produced simultaneously on two adjacent tube connectors on the heat exchanger.

The crimping tool according to the invention is designed to create at least one connection between a tube and a tube connector through which coolant can be conducted. The connection can be created between a tube connector on the heat exchanger and a tube. The connection can also be obtained between a separate tube connector and a tube. The crimping tool has at least one clamp with which the tube connector can be temporarily held in the crimping tool. The crimping tool also has a crimping unit for the tube connector that has precisely two crimping elements. Each crimping element has precisely two crimping teeth for obtaining exactly two crimps on the respective tube connector. The two crimping teeth are parallel and spaced apart on the respective crimping elements. The two crimping elements on the crimping unit can be moved toward and away from one another, such that all of the crimping teeth move in the same plane, parallel to one another, toward the tube connectors.

The tube connectors can be positioned and held in place with the clamp in the crimping tool. The tube connectors are placed in the crimping tool for this, such that the crimping elements in the crimping tool can move toward and away from the tube connectors to the crimps can be formed on the tube connector. When the crimps are formed, the tube is permanently connected to the tube connector, i.e. a firm connection is obtained between the tube and the tube connector. This is how the connection is obtained between the tube and the tube connector through which coolant can be conducted. A method for producing this connection with the crimping tool shall be explained in greater detail below.

The two crimping elements can be moved toward and away from one another in the crimping tool. All of the crimping teeth on the two crimping elements move parallel to one another in the same plane. The two crimping elements in each crimping unit can move along an axis that intersects the central longitudinal axis of the respective tube connector at a right angle, transverse thereto. The crimping teeth in the crimping elements can therefore be moved toward and away from the tube connectors, parallel to the crimping axis. Along a third axis, which is at a right angle to the central longitudinal axis of the tube connector and at a right angle to the crimping axis, there is free space that is not occupied when the two crimping elements are moved toward and away from one another. Consequently, the heat exchanger can have other elements, e.g. a second tube connector, in this free space.

Each crimping tooth forms a respective crimp. Each crimping element forms two adjacent crimps. The two crimping elements in the crimping unit therefore form or generate a total of four crimps on the tube connector. The crimping elements can be made of stainless steel, for example. Crimping elements of stainless steel are particularly suitable for crimping tube connectors made of aluminum. These crimping elements can also be tempered. Crimping elements made of tempered stainless steel are particularly suitable for crimping tube connectors made of other materials that are harder than aluminum.

The crimping teeth on the crimping elements can fit the outer diameter of the tube. In particular, these crimping teeth can be formed on the crimping elements such that the crimping teeth are all the same distance to the tube when forming the crimps. Furthermore, the width of the crimping elements transverse to the crimping axis can also be fit to the outer diameter of the tube. In particular, the minimum width of the crimping elements can be identical or nearly identical to the outer diameter of the tube. The width of the crimping elements can therefore be 18.5 mm if the outer diameter of the tube is 18 mm, if the outer diameter of the tube is 15 mm, the width of the crimping element can be 15.5 mm, and if the outer diameter of the tube is 12 mm, the width of the crimping elements can be 12.5 mm. The outer diameter of the tube is the diameter of the outer surface of the tube beyond the tube connector, as shall be explained in greater detail below.

The crimping tool can contain exactly two crimping units for exactly two tube connectors. All of the crimping elements in the crimping units, and all of the crimping teeth in the crimping elements can move parallel to one another in the same plane toward the respective tube connectors. The two crimping elements in each crimping unit can each move toward and away from one another along a crimping axis, as described above. Accordingly, a free space can be obtained around the tube connector along a third axis, as described above. The two crimping units can be placed in the crimping tool such that the crimping axes of the two crimping units are parallel to one another.

The two crimping units can also be designed such that the first crimping unit, or one of the crimping elements in the first crimping unit, can move in the free space in the second crimping unit, and the second crimping unit, or one of the crimping elements in the second crimping unit, can move in the free space in the first crimping unit. When forming the crimps, the adjacent crimping elements in the two crimping units can be spaced apart from one another by a distance of between 0.5 mm and 2 mm, preferably 1.5 mm. The two crimping units can therefore move in a very narrow space between the two tube connectors, and the connections can be obtained simultaneously on tube connectors that are close to one another. This significantly reduces the amount of work and the costs involved in producing the connections, in particular on the heat exchanger.

The crimping tool can contain a first movement unit for each crimping unit that moves the crimping elements toward and away from one another, or toward and away from the tube connector. This first movement unit can move the two crimping elements in each crimping unit toward and away from one another along a crimping axis that is transverse or perpendicular to the central longitudinal axis of the tube connector. The crimping axes can intersect the central longitudinal axes of the respective tube connectors in the crimping plane. The respective crimping axes can be parallel to the length or width of the heat exchanger. The crimping tool can also have a second movement unit for each of the crimping units that moves the respective crimping units toward the tube connectors. The second movement units can move the two crimping elements in each crimping unit toward the respective tube connector along the crimping axis. The crimping axis can be transverse or perpendicular to the central longitudinal axis of the respective tube connector and transverse or perpendicular to the crimping axis described above. The respective movement axes can be parallel to the length or width of the heat exchanger. The first movement unit and/or second movement unit can be powered pneumatically, mechanically, electrically, or hydraulically.

To avoid repetition, reference is made at this point to the descriptions of the heat exchanger and the method, from which further features of the crimping tool can be derived.

The invention also relates to a heat exchanger comprising a heat exchanger block for a motor vehicle. The heat exchanger can be a heater, cooler, vaporizer, or condenser. The heat exchanger has at least one tube connector with a central longitudinal axis, which is permanently connected to the heat exchanger block for conducting coolant. The heat exchanger also contains at least one tube, part of which is inserted coaxially into the tube connector such that it can conduct coolant. The tubes have a circumferential outer stop, and the tube connectors have circumferential inner stops, and when the tube is inserted in the tube connector, these stops bear on one another axially. The tube connectors have four crimps on their rims where they come in contact with the tube, which are formed by the crimping tool described above. The stop on the tube is axially enclosed at the crimps between the stop on the tube connector and the rim of the tube connector, such that a connection through which coolant can be conducted is formed on the heat exchanger.

In this context, the terms, "axial," "radial," and "circumferential," always refer to the central longitudinal axis of the respective tube connector. The tubes are placed in the respective tube connectors coaxially thereto, such that the central longitudinal axes of the tube connectors coincide with those of the tubes. The terms, "axial," "radial," and "circumferential," used in the context of the tubes accordingly relate to the central longitudinal axes of the tube connectors once the tubes have been placed coaxially therein. The longitudinal ends of the tube connectors are always the longitudinal ends thereof where the tubes are inserted. The longitudinal ends of the tubes are always the ends thereof that are inserted into the tube connectors. The stops divide the tubes into two sections, one of which remains outside the tube connector, while the other is inserted into the tube connector. The outer diameters of each section of the tube can be different. In particular, the part of the tube inserted into the tube connector can be compressed therein, such that its outer diameter is different than that of the other part of the tube. In the description of the present invention, any references to the outer diameter of the tube refer to its section lying outside the tube connector.

The four crimps on the tube connectors firmly connect the tube connectors to the tubes, thus forming the connection to the heat exchanger through which coolant can be conducted. The coolant connection can consequently withstand pressures of up to 30 bar, or at least 20 bar. When the tubes are connected at the crimps to the tube connectors, the rims of the tube connectors bear on the stops formed on the tubes. This rim can extend over the tube beyond the crimps.

The method for creating the connections shall be explained in greater detail below. The crimps on the tube connectors are formed by a crimping unit in the crimping tool, which contains exactly two crimping elements, which each have exactly two crimping teeth. The four crimps therefore form two pairs of crimps that are opposite one another in relation to the central longitudinal axes of the tube connectors. These crimps are formed when the two crimping elements in the crimping unit are moved toward and away from one another and the crimping teeth move parallel to one another in the crimping plane.

The heat exchanger can have exactly two connections between exactly two tubes and exactly two tube connectors on the heat exchanger. The two tube connectors can be formed on the heat exchanger block at a minimum distance between the central longitudinal axes thereof that is 1.5 to 2.5 times, preferably twice the size of the outer diameter of the tube adjacent to the stop outside the tube connector. If the tube has an outer diameter of 18 mm, this minimum distance can be 27 mm to 45 mm, preferably 36 mm, with a tube that has an outer diameter of 15 mm, this minimum distance can be from 22.5 mm to 37.5 mm, preferably 30 mm, and with a tube that has an outer diameter of 12 mm, this minimum distance can be between 18 mm and 30 mm, preferably 24 mm.

The two tube connectors can be placed on the heat exchanger block in relation to a length of the heat exchanger at a minimum distance between the central longitudinal axes of 1.5 to 2.5 times, preferably twice, the size of the outer diameter of the tube adjacent to the stop outside the tube connector. In the case of a tube with an outer diameter of 18 mm, this minimum distance can be between 27 mm and 45 mm, preferably 36 mm, with a tube that has an outer diameter of 15 mm, this minimum distance can be between 22.5 mm and 37.5 mm, preferably 30 mm, and with a tube that has an outer diameter of 12 mm, this minimum distance can be between 18 mm and 30 mm, preferably 24 mm.

The two tube connectors can also be placed on the heat exchanger block in relation to the width of the heat exchanger at a minimum distance between the central longitudinal axes of 1.5 to 2.5 times, preferably twice the size of the outer diameter of the tube adjacent to the stop outside tube connector. In the case of a tube with an outer diameter of 18 mm, this minimum distance can be between 27 mm and 45 mm, preferably 36 mm, with a tube that has an outer diameter of 15 mm, this minimum distance can be between 22.5 mm and 37.5 mm, preferably 30 mm, and with a tube that has an outer diameter of 12 mm, the minimum distance can be between 18 mm and 30 mm, preferably 24 mm.

The stops on the tubes can be formed by a circumferential collar that protrudes radially away therefrom. Regardless of the outer diameter of the respective tube, these collars on the tubes can have an axial height of 1.5 mm to 3 mm and a radial width of 2 mm to 3 mm.

The stops on the tube connectors can form a ridge protruding radially inward. Regardless of the outer diameters of the tubes, these ridges can be 1.5 to 2.5 mm wide. In particular, the ridges on the tube connectors can have a radial width of 2.0 mm.

The outer diameter of the tube at the collar is ideally greater than the inner diameter of the tube connector at the ridge, such that the collar on the tube bears axially on the ridge in the tube connector. An axial height of the ridge at the rim of the tube connector can correspond to the radial width and axial height of the collar on the tube. This correspondence is of particular relevance for the formation of the crimps on the rim of the tube connector. The axial height of the ridge can be between 4 mm and 8 mm, for example. In particular, this axial height of the ridge can be between 4.5 mm and 6 mm.

The heat exchanger can have at least one ring seal, which can be adjacent to the stop on the tube, facing away from the rim of the tube connector, such that it is clamped between the tube and the tube connector in a sealing manner. The tube and tube connector can be radially spaced apart at the ring seal. This radial spacing can be between 1.5 mm and 2.5 mm, in particular 2 mm. The radial distance between the tube and the tube connector is ideally smaller than the radial width of the ring seal, such that the connection is sealed by the ring seal when coolant is conducted through it. The spacing between the tube and the tube connector can be obtained by a second ridge in the tube connector that faces radially inward. This ridge can be axially adjacent to the first ridge, and formed further away from the rim of the tube connector.

To avoid repetition, reference is made at this point to the descriptions of the crimping tool and the method, from which further features of the heat exchanger can be derived.

The invention also relates to a method for producing at least one connection between a tube and a tube connector using the crimping tool described above. It is possible to connect a tube connector on a heat exchanger to a tube using this method. It is also possible to connect a separate tube connector to a tube. The tube connector is first temporarily held in place in the crimping tool with the clamp. The tube is then slid coaxially into the tube connector until the stop on the tube comes in contact with the stop in the tube connector. Four crimps are then formed with the crimping tool on the rim of the tube connector where it is radially adjacent to the tube. This encloses the stop on the tube at the crimps between the stop in the tube connector and the edge thereof in the axial direction. This permanently connects the tube to the tube connector in the axial direction such that coolant can be conducted through the connection.

Before inserting the tube into the tube connector, a ring seal can be placed on the tube between the stop and the end of the tube. After inserting the tube into the tube connector, the ring seal is located between the stop in the tube connector and the end of the tube, clamping it between the tube and tube connector in a sealing manner. This O-ring seal seals the connection against the exterior.

Exactly two connections between exactly two tubes and exactly two tube connectors can be produced with the method. The crimps are formed simultaneously on the two tube connectors with the crimping tool. The minimum spacing between central longitudinal axes of the two tube connectors can be 1.5 to 2.5 times, preferably twice the size of the outer diameter of a part of the tube adjacent to the stop outside the tube connector. In the case of a tube with an outer diameter of 18 mm, this minimum distance can be between 27 mm and 45 mm, preferably 36 mm, with a tube that has an outer diameter of 15 mm, this minimum distance can be between 22.5 mm and 37.5 mm, preferably 30 mm, and with a tube that has an outer diameter of 12 mm, this minimum distance can be between 18 mm and 30 mm, preferably 24 mm. The crimping teeth on the crimping element in the crimping tool can fit to the dimensions of the tube connector, and placed such that it is possible to create the crimps on the two tube connectors simultaneously.

Heat exchangers like coolers, chillers or radiators have refrigerants that flow therethrough. Some types of refrigerants, particularly those that include per- and polyfluoroalkyl substances (PFAS) may be restricted from use in various countries, such as the United States and various countries within Europe in the future. Examples of refrigerants with PFAS are R1234yf or R134a. Per- and polyfluoroalkyl substances are aliphatic organic compounds in which the hydrogen atoms on the carbon framework have been completely replaced by fluorine atoms on at least one carbon atom. Since they or their degradation products are very persistent in the environment, they are also called eternity chemicals. Examples for a refrigerant without per- and polyfluoroalkyl substances are propane (R290) or carbon dioxide (R744). The number of heat exchangers (or the amount of heat exchange surface available) in the refrigerant cycle may need to increase if switching from the use of refrigerant with per- and polyfluoroalkyl substances to a refrigerant without per- and polyfluoroalkyl substances because the thermodynamic characteristics of the refrigerants are different. Thus, the number of the connections within heat exchangers that do not use PFAS may be increased over heat exchangers that use PFAS. Propane (R290) is flammable. To minimize the safety risks of using Propane (R290) as a refrigerant, the amount of refrigerant when using Propone may be designed to be kept as low as possible. The thermodynamic characteristics of Propane (R290) is better than in-series used refrigerants, and therefore it is possible to reduce the size of the heat exchanger that uses Propane, therefore providing less space within the heat exchange tubes that are available for the crimp connections. By the advantageous use of the crimping tool according to the invention, the distance between the crimping connections can be reduced.

To avoid repetition, reference is made at this point to the descriptions of the crimping tool and the heat exchanger, from which further features of the method can be derived.

Further features and advantages of the invention can be derived from the dependent claims, the drawings, and the associated descriptions of the drawings.

It should be understood that the features specified above and described below can be used not only in the given combinations, but also in other combinations or in and of themselves, without abandoning the scope of the present invention.

Preferred exemplary embodiments of the invention are shown in the drawings and shall be explained in greater detail below, in which the same reference symbols relate to the same, similar, or functionally identical components.

Figure 1:
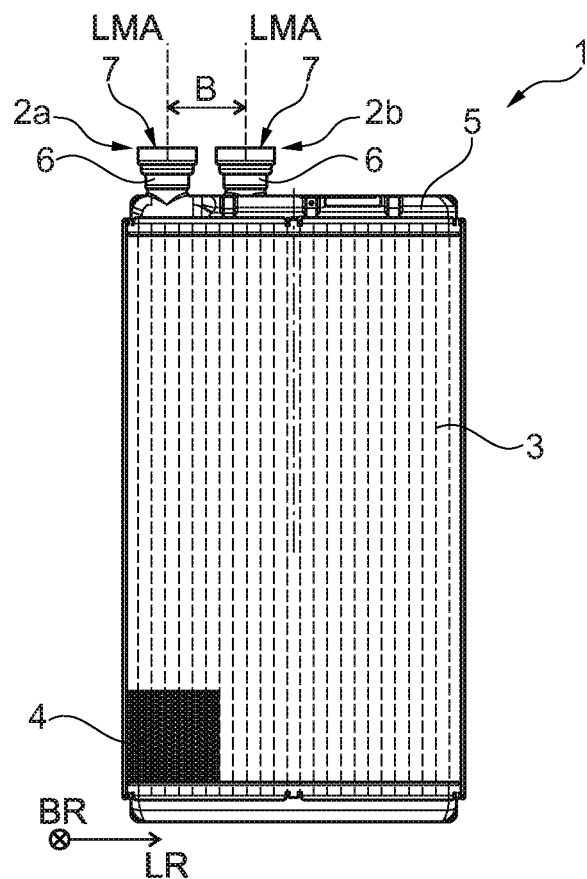
FIG. 1 shows a side view of a heat exchanger according to the invention, prior to creating a connection.
Figure 2:
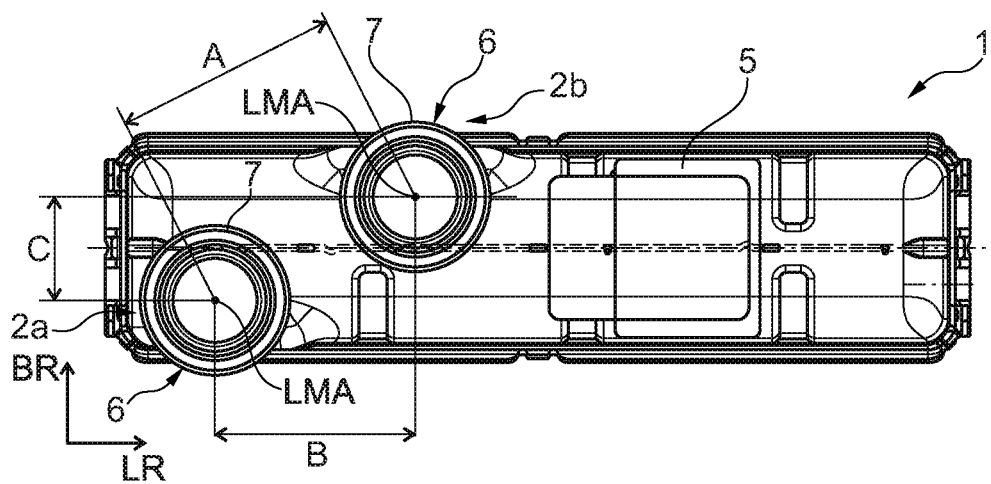
FIG. 2 shows a top view of a heat exchanger according to the invention prior to creating a connection.

FIG. 1 shows a side view and FIG. 2 shows a top view of a heat exchanger 1 according to the invention, prior to creating the connections 2a and 2b. The heat exchanger 1 has a heat exchanger block 3 that has numerous coolant channels 4 and a coolant container 5. The heat exchanger 1 also has two identical tube connectors 6 attached to the container 5 in the heat exchanger block 3 that are connected to the channels 4 through the container 5 such that coolant can be conducted through them. The two tube connectors 6 are offset to one another on the heat exchanger 1 in the lateral direction BR and the longitudinal direction LR thereof. The central longitudinal axes LMA of the tube connectors 6 are at a distance A to one another. The central longitudinal axes LMA of the tube connectors 6 are at a distance B to one another in the longitudinal direction LR and a distance C to one another in the lateral direction BR on the heat exchanger 1.

Figure 3:
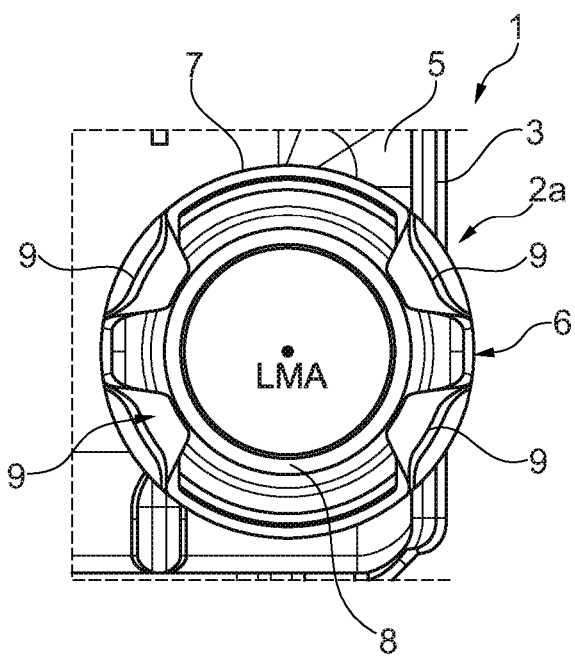
FIG. 3 shows a top view of a connection between a tube connector and a tube on the heat exchanger according to the invention.

FIG. 3 shows a top view of the connection 2a. The connection 2b is identical to the connection 2a. The heat exchanger 1 has two identical tubes 8 through which coolant can be conducted, which are partially inserted coaxially into the tube connectors 6 and permanently attached thereto at four crimps 9 in each case. The connections 2a and 2b are created with a method using a crimping tool, both of which are described in greater detail below.

Figure 4:
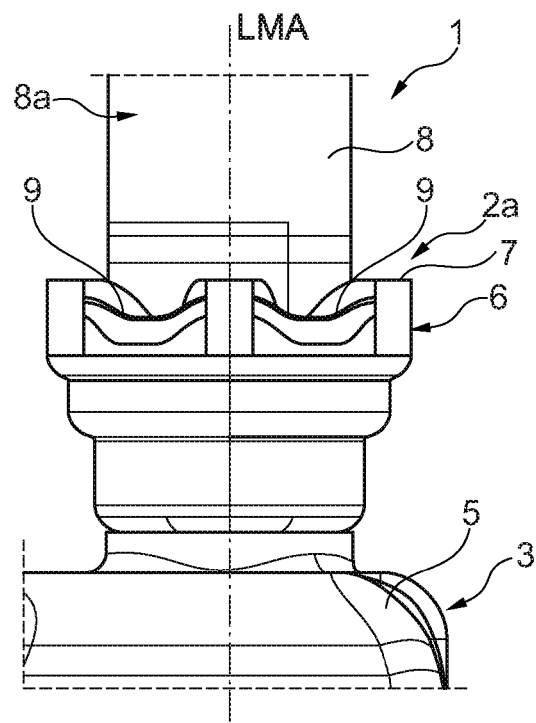
FIG. 4 shows a side view of the heat exchanger according to the invention at a connection.
Figure 5:
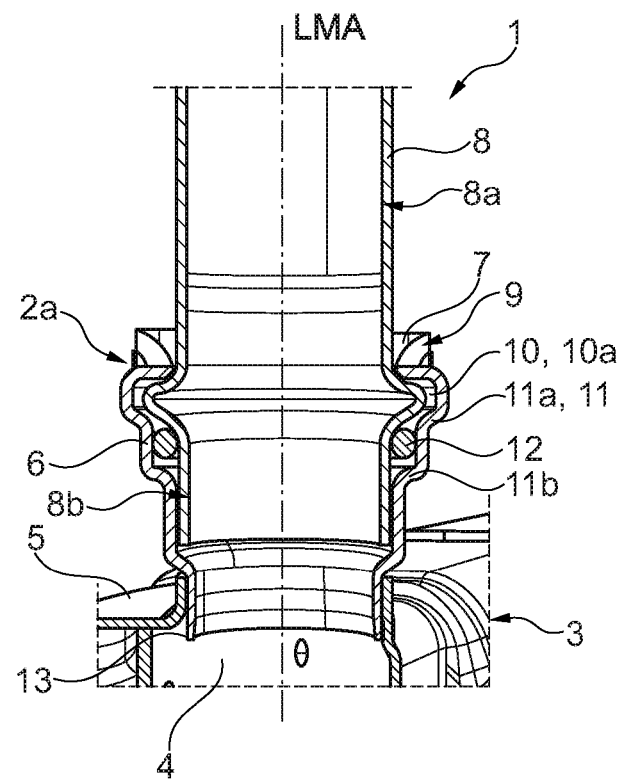
FIG. 5 shows a sectional view of the heat exchanger according to the invention at the connection.

FIG. 4 shows a side view and FIG. 5 shows a sectional view of the heat exchanger 1 according to the invention at the connection 2a. The connection 2b is identical to the connection 2a. The tube 8 is partially inserted coaxially into the tube connector 6 at the connection 2a such that the central longitudinal axis of the tube 8 coincides with the central longitudinal axis LMA of the tube connector 6. The tube 8 has a stop 10 that protrudes radially outward, formed in this case by a collar 10a. The stop 10, or collar 10a divides the tube into a tube section 8a, which remains outside the tube connector 6, and a tube section 8b, which is inserted into the tube connector 6. The tube sections 8a and 8b are axially adjacent to one another and separated from one another by the stop 10, or collar 10a. It should be clear that the outer diameters of the tube at the two tube sections 8a and 8b can differ. In particular, the tube section 8b can be compressed, such that its outer diameter is smaller than that of the tube section 8a. The tube connector 6 has a circumferential inner stop 11, formed in this case by a ridge 11a that protrudes radially inward. The collar 10 bears on one side against the ridge 11a in the axial direction.

The heat exchanger 1 has two ring seals 12 for the two connections 2a and 2b. The ring seals 12 are placed between the collars 10a on the tubes 8 and the ends 13 of the tubes 8, and between the ridges 11a on the tube connectors 6 and second ridges 11b that also protrude radially inward in the tube connectors 6. The ring seals 12 are clamped between the tubes 8 and the tube connectors 6 to form a radial seal.

The rims 7 on the tube connectors 6 are crimped against the tubes 8 at the crimps 9, such that the collars 10a on the tubes 8 are enclosed axially between the ridges 11a in the tube connectors 6 and the rims 7 of the tube connectors 6. This results in a firm connection between the tube 8 and the tube connector 6 in the axial direction, i.e. a firm connection is obtained in the axial direction and the tube 8 is permanently connected to the tube connector 6. These crimps form a connection 2a that can withstand pressures of up to 30 bar, or at least 20 bar.

The heat exchanger 1 can be a heater, cooler, vaporizer, or condenser. The tubes 8 and tube connectors 6 can be of different sizes, depending on the design of the heat exchanger. The tubes 8 can have outer diameters of 18 mm, 15 mm, or 12 mm, by way of example. The distance A and distance B between the tube connectors 6 defined above can be at least 1.5 to 2.5 times, preferably twice, the size of the outer diameter of the tube 8 beyond the stop 10a in the tube section 8a. The minimum distance A and minimum distance B between the two tube connectors 6 can therefore be 27-45 mm, preferably 36 mm, or 22.5-37.5 mm, preferably 30 mm, or 18-30 mm, preferably 24 mm. The distance C between the two tube connectors 6 defined above can be at least the same as the outer diameter of the tube 8 outside the stop 10a. The minimum distance C between the two tube connectors 6 can therefore be 18 mm, 15 mm, or 12 mm.

Regardless of the outer diameter of the tube 8 at the tube section 8a or tube section 8b, the collar 10a on each tube 8 can have an axial height of 1.5 mm to 3 mm and a radial width of 2 mm to 3 mm. The ridge 11a in each tube connector 6 can have a radial width of 1.5 mm to 2.5 mm, regardless of the outer diameter of the tube 8 inserted therein. The axial height of the ridge 11a extending to the rim 7 of the tube connector 6 can be fit to the collar 10a on the tube 8 inserted therein, such that it is between 4 mm and 8 mm, in particular between 4.5 mm and 6 mm. The ridge 11b in the tube connector 6 can have a radial width of 1.5 mm to 2.5 mm, regardless of the outer diameter of the tube 8 inserted therein. The rim 7 of the tube connector 6 can be at an axial distance of up to 2 mm to the collar 10a on the tube 8 inserted therein at the crimps 9. It is clear that these dimensions for the tubes 8 and tube connectors 6 are merely examples.

Figure 6:
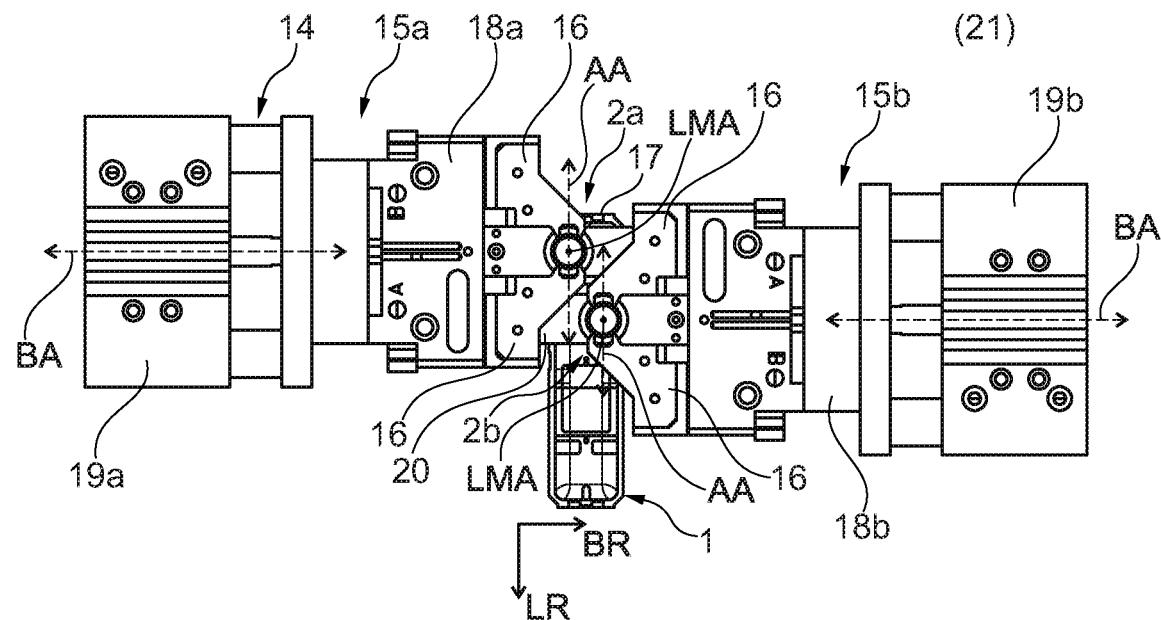
FIG. 6 shows a top view of a crimping tool according to the invention when creating the connection to the heat exchanger according to the invention.

FIG. 6 shows a top view of a crimping tool 14 according to the invention while creating the connections 2a and 2b on the heat exchanger 1 according to the invention. The crimping tool 14 has two crimping units 15a and 15b for creating the respective connections 2a and 2b. The crimping units 15a and 15b each have exactly two crimping elements 16 with exactly two crimping teeth 17 that are parallel to one another. This results in a total of four crimping teeth 17 for forming four crimps 9 in each crimping unit 15a and 15b.

The crimping elements 16 in the crimping units 15a and 15b can be moved toward and away from one another along a crimping axis AA. The crimping axes AA for the two crimping units 15a and 15b are parallel to one another and to the longitudinal direction LR of the heat exchanger 1. The crimping axes AA are also transverse to the central longitudinal axes LMA of the tube connectors 6, and intersect them. The crimping teeth 17 are parallel to one another in the crimping units 15a and 15b, and can move parallel to the crimping axes AA. All of the crimping teeth can therefore move parallel to one another in the crimping tool 14. The movements of the crimping elements 16 and crimping teeth 17 in the crimping tool 14 all take place in the same plane.

The crimping units 15a and 15b can move along movement axes BA toward the tube connector 6 or toward the heat exchanger 1. The movement axes BA for the crimping units 15a and 15b are parallel to one another, and to the lateral direction BR of the heat exchanger 1 defined above. The movement axes BA are transverse to the crimping axes AA of the crimping elements 16 and intersect the central longitudinal axes LMA of the respective tube connectors 6. When the two crimping units are placed on the tube connectors 6, their crimping elements 16 have a spacing E of at least 0.5 to 2 mm, preferably 1.5 mm, apart from one another.

The crimping tool 14 has a first movement unit 18a and 18b and a second movement unit 19a and 19b for each crimping unit 15a and 15b. These movement units 18a, 18b, 19a, 19b can be powered pneumatically, mechanically, electrically, or hydraulically. The first movement units 18a and 18b move the crimping elements 16 in the crimping units 15a and 15b toward and away from one another along the crimping axis AA. The second movement units 19a and 19b move the crimping units 15a and 15b toward the connections 2a and 2b along the respective movement axes BA. The second movement units 19a and 19b first bring the first movement units 18a and 18b to the respective tube connectors 6 and then the first movement units 18a and 18b create the crimps 9 on the tube connectors 6.

The crimping tool 14 also has a clamp 20 for temporarily holding the heat exchanger 1 in the crimping tool 14. The heat exchanger 1 is temporarily held by the clamp 20 in the crimping tool 14 such that the crimps can be formed on the tube connectors 6 by the crimping units 15a and 15b in the crimping tool 14.

When the connections 2a and 2b are formed with the method 21 according to the invention, the heat exchanger 1 is temporarily held in the crimping tool 14 by the clamp 20. The tubes 8 are then coaxially inserted into the tube connectors 6. At this point, the collar 10a comes in contact with the ridge 11a, such that the tubes 8 are held in place axially in the tube connectors 6 in the insertion direction. Before inserting the tubes 8 in the tube connectors 6, ring seals 12 can be placed on the tubes 8. The crimping units 15a and 15b are then moved by the second movement units 19a and 19b along the movement axes BA to the tube connectors 6, i.e. toward one another. The crimping elements 16 are then moved by the first movement units 18a and 18b along the crimping axes AA to the tube connectors 6, i.e. toward one another. This creates the crimps 9 on the tube connectors 6. The crimping elements 16 are then removed from the tube connectors 6, i.e. away from one another, and the crimping units 15a and 15b are removed from the heat exchanger 1, i.e. apart from one another. The heat exchanger 1 is then removed from the crimping tool 14.

Figure 7:
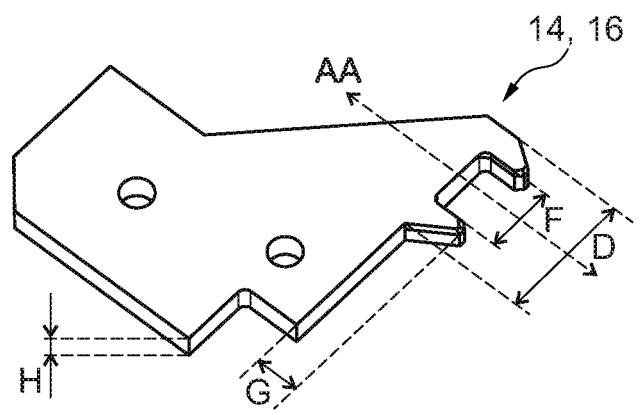
FIG. 7 shows a crimping element in the crimping tool according to the invention shown in FIG. 6.

FIG. 7 shows a crimping element 16 from the crimping tool 14 shown in FIG. 6. This crimping element 16 has a width D transverse to the crimping axis AA that basically corresponds to the outer diameter of the tube 8. The width D of the crimping element 16 can therefore be 18.5, 15.5, or 12.5 mm, for example. The distance F between the crimping teeth 17 at a right angle to the crimping axis AA can be one third to one half of the outer diameter of the tube 8 at the tube section 8a. The distance F between the two crimping teeth 17 can therefore be 6-9 mm, 5-7.5 mm, or 4-6 mm, for example. The lengths G of the crimping teeth 17 parallel to the crimping axis AA can be one fourth to one third of the outer diameter of the tube 8 at the tube section 8a. The lengths G of the crimping teeth 17 can therefore be 4.5-6 mm, 3.75-5 mm, or 3-4 mm. The thickness H of the crimping elements 16 can be 3.5 mm to 4.5 mm.

Figure 8:
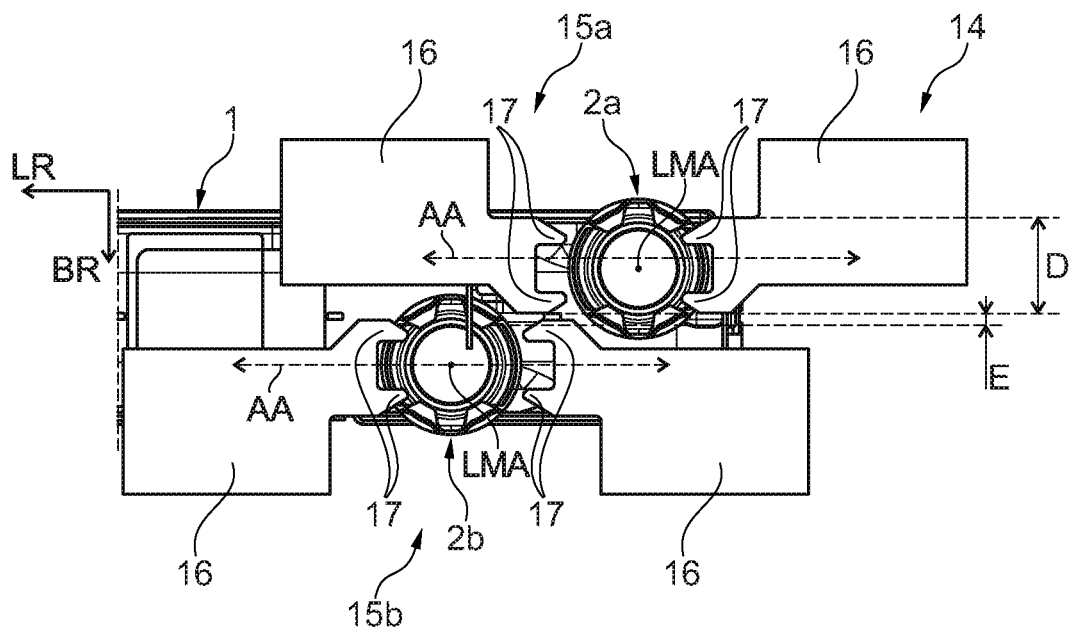
FIG. 8 shows a top view of another crimping tool according to the invention when creating the connection to the heat exchanger according to the invention.

FIG. 8 shows a top view of the crimping tool 14 according to the invention when creating the connections 2a and 2b to the heat exchanger 1 according to the invention. The two adjacent crimping elements 15 are at a distance E to one another when forming the crimps 9. The minimum distance E can be from 0.5 mm to 2 mm, preferably 1.5 mm. The crimping elements 15 in FIG. 8 differ from the crimping elements 16 shown in FIGS. 6 and 7. The dimensions of the crimping elements 16 defined above are the same here as in FIGS. 6 and 7. The rest of the crimping tool 14 in FIG. 8 is the same as that shown in FIG. 6.

Figure 9:
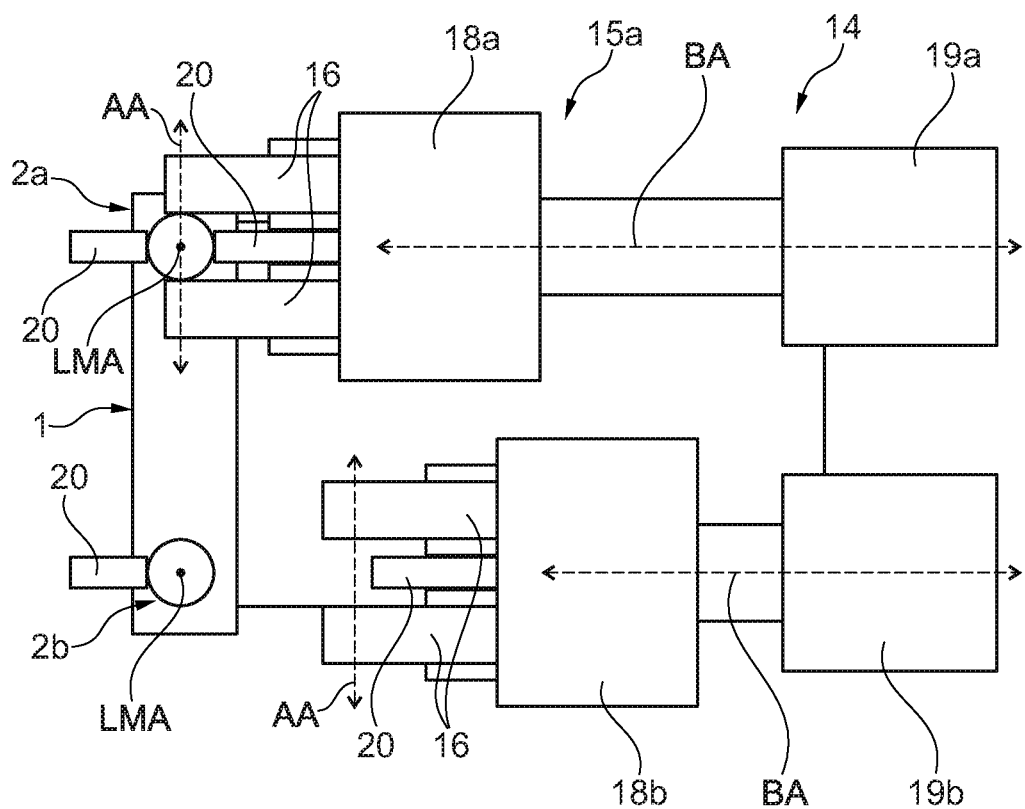
FIG. 9 shows a top view of another crimping tool according to the invention when creating the connection to the heat exchanger according to the invention.

FIG. 9 shows a top view of the other crimping tool 14 according to the invention when creating the connections 2a and 2b to the heat exchanger 1 according to the invention. The heat exchanger 1 has two tube connectors 6 in this case, which are spaced apart on the heat exchanger block 3. The central longitudinal axes LMA of the tube connectors 6 are at distances A, B, and C to one another, which are greater than the distances A, B, and C defined above. In this case, the tube connectors 6 are far enough apart from one another that the two crimping units 15a and 15b can be moved to the tube connectors 6 from one side of the heat exchanger 1. The rest of the crimping tool 14 is the same as the crimping tools 14 shown in FIGS. 6 and 8.

The specification will be readily understood with reference to the following Numbered Paragraphs:

Numbered Paragraph 1. A crimping tool (14) for creating at least one connection (2a, 2b) between a tube (8) and a tube connector (6) through which coolant can be conducted, preferably a tube connector (6) for a heat exchanger (1), wherein
 the crimping tool (14) has a crimping unit (15a, 15b) for each tube connector (6) that has exactly two crimping elements (16),
 each crimping element (16) has exactly two crimping teeth (17) with which exactly two crimps (9) are created on the tube connector (6) in question,
 the two crimping teeth (17) in the crimping element (16) are parallel to one another and spaced apart on the crimping element (16), and
 the two crimping elements (16) one each crimping unit (15a, 15b) are moved toward and away from one another in the process of forming the crimps (9), and in this manner, all crimping teeth (17) are moved, parallel to one another in the same crimping plane, toward the tube connector (6) in question.

Numbered Paragraph 2. The crimping tool according to Numbered Paragraph 1, characterized in that the crimping tool (14) has exactly two crimping units (15a, 15b) for exactly two tube connectors (6), and all of the crimping elements (16) in the crimping units (15a, 15b) and all of the crimping teeth (17) on the crimping elements (16) can be moved, parallel to one another in the same crimping plane, toward the tube connector (6) in question.

Numbered Paragraph 3. The crimping tool according to Numbered Paragraph 1 or 2, characterized in that
the crimping tool (14) has a first movement unit (18a, 18b) for each crimping unit (15a, 15b), which is preferably powered pneumatically, mechanically, electrically, or hydraulically, for moving the two crimping elements (16) toward and away from one another, and/or
the crimping tool (14) has a second movement unit (19a, 19b) for each crimping unit (15a, 15b), which is preferably powered pneumatically, mechanically, electrically, or hydraulically, for moving the respective crimping units (15a, 15b) toward the tube connector (6) in question.

Numbered Paragraph 4. A heat exchanger (1) for a motor vehicle, wherein
the heat exchanger (1) has at least one heat exchanger block (3) through which coolant can be conducted,
the heat exchanger (1) has at least one tube connector (6) that has a central longitudinal axis (LMA) and is permanently connected to the heat exchanger block (3) and can conduct coolant, and
the heat exchanger (1) has at least one tube (8) and part of each tube (8) is inserted coaxially into a tube connector (6) and can conduct coolant,
wherein
each tube (8) has a circumferential stop (10) protruding radially outward, and each tube connector (6) has a circumferential stop (11) that protrudes radially inward,
each tube (8) bears axially at its stop (10) against the stop (11) on the tube connector (6) into which it has been inserted,
the tube connector (6) has four crimps (9) on its rim (7) where it bears radially against the tube (8), and the crimps (9) are formed on each tube connector (6) using the crimping tool (14) according to any of the Numbered Paragraphs 1 to 3, and
the stops (10) on the tubes (8) are axially enclosed at the crimps (9) between the stops (11) on the tube connectors (6) and the rims (7) of the tube connectors (6), thus forming connections (2a, 2b) to the heat exchanger (1) through which coolant can be conducted.

Numbered Paragraph 5. The heat exchanger according to Numbered Paragraph 4, characterized in that the stops (10) on the tubes (8) are formed by a circumferential collar (10a) that protrudes radially outward, and the stops (11) in the tube connectors (6) are formed by a circumferential ridge (11a) that protrudes radially inward.

Numbered Paragraph 6. The heat exchanger according to Numbered Paragraphs 4 or 5, characterized in that the heat exchanger (1) has at least one ring seal (12), and each ring seal (12) is adjacent to a stop (10) on a tube (8) and clamped radially, in a sealing manner, between the tube (8) and tube connector (6) on the side of the stop facing away from the rim (7) of the tube connector (6).

Numbered Paragraph 7. The heat exchanger according to any of the Numbered Paragraphs 4 to 6, characterized in that the heat exchanger (1) has exactly two connections (2a, 2b) between exactly two tubes (8) and exactly two tube connectors (6) on the heat exchanger (1), wherein
the two tube connectors (6) are placed on the heat exchanger block (3) at a minimum distance between the central longitudinal axes (LMA) thereof of 1.5 to 2.5 times, preferably twice the outer diameter of a tube section (8a) of the tube (8) that is adjacent to the stop (10) outside the tube connector (6), and/or
the two tube connectors (6) are placed on the heat exchanger block (3) at a minimum spacing (B) between the central longitudinal axes (LMA) thereof in the longitudinal direction (LR) of the heat exchanger (1) that is 1.5 to 2.5 times, preferably twice the outer diameter of a tube section (8a) of the tube (8) that is adjacent to the stop (10) outside the tube connector (6), and/or
the two tube connectors (6) are placed on the heat exchanger block (3) at a minimum spacing (C) between the central longitudinal axes (LMA) thereof in the lateral direction (BR) of the heat exchanger (1) that is 0.5 to 1.5 times, preferably the same as the outer diameter of a tube section (8a) of the tube (8) that is adjacent to the stop (10) outside the tube connector (6).

Numbered Paragraph 8. The heat exchanger according to any of the Numbered Paragraphs 4 to 6 characterized in that
the heat exchanger is flowed through by a refrigerant, wherein the refrigerant is without per- and polyfluoroalkyl substances.

Numbered Paragraph 9. The heat exchanger according to claim 8, characterized in that the refrigerant is propane.

Numbered Paragraph 10. A method (21) for producing at least one connection (2a, 2b) between a tube (8) and a tube connector (6) through which coolant can be conducted, preferably a tube connector (6) for a heat exchanger (1) according to any of the Numbered Paragraphs 4 to 7, using a crimping tool (14) according to any of the Numbered Paragraphs 1 to 3, wherein
the tube connector (6) is temporarily held in the crimping tool (14) by a clamp (20) in the crimping tool (14);
the tube (8) is inserted into the tube connector (6) coaxially to the central longitudinal axis (LMA) thereof, until the stop (10) on the tube (8) comes in axial contact with the stop (11) on the tube connector (6);
four crimps (9) are formed with the crimping tool (14) on the rim (7) of the tube connector (6) where it is radially adjacent to the tube (8); and
the stops (10) on the tubes (8) are axially enclosed at the crimps (9) between the stops (11) on the tube connectors (6) and the rims (7) of the tube connectors (6), thus forming the connections (2a, 2b) through which coolant can be conducted.

Numbered Paragraph 11. The method according to Numbered Paragraph 10, characterized in that
prior to inserting the tubes (8) into the tube connectors (6), a ring seal (12) is placed on each tube (8) between the stop (10) and the end of the tube (8); and
after inserting the tubes (8) into the tube connectors (6), the ring seals (12) are located axially between the stops (11) on the tube connectors (6) and the ends of the tubes (8) and clamped between the tubes (8) and the tube connectors (6) to form a radial seal.

Numbered Paragraph 11. The method according to either of Numbered Paragraphs 10 or 11, characterized in that exactly two connections (2a, 2b) are formed with the method (21) between exactly two tubes (8) and exactly two tube connectors (6), wherein the crimps (9) on the two tube connectors (6) are formed simultaneously with the crimping tool (14).

The invention claimed is:

1. A crimping tool for creating at least one connection between a tube and a tube connector through which coolant can be conducted, preferably a tube connector for a heat exchanger, wherein
the crimping tool has a crimping unit for each tube connector that has exactly two crimping elements,
each crimping element has exactly two crimping teeth with which exactly two crimps are created on the tube connector,
the two crimping teeth in the crimping element are parallel to one another and spaced apart on the crimping element, and
the two crimping elements one each crimping unit are moved toward and away from one another in a process of forming the crimps, and in this manner, all crimping teeth are moved, parallel to one another in the same crimping plane, toward the tube connector.

2. The crimping tool according to claim 1, wherein the crimping tool has exactly two crimping units for exactly two tube connectors, and all of the crimping elements in the crimping units and all of the crimping teeth on the crimping elements can be moved, parallel to one another in the same crimping plane, toward the tube connector.

3. The crimping tool according to claim 1, wherein
the crimping tool has a first movement unit for each crimping unit, which is preferably powered pneumatically, mechanically, electrically, or hydraulically, for moving the two crimping elements toward and away from one another, and/or
the crimping tool has a second movement unit for each crimping unit, which is preferably powered pneumatically, mechanically, electrically, or hydraulically, for moving the respective crimping units toward the tube connector.

4. A heat exchanger for a motor vehicle, wherein
the heat exchanger has at least one heat exchanger block through which coolant can be conducted,
the heat exchanger has at least one tube connector that has a central longitudinal axis and is permanently connected to the heat exchanger block and can conduct coolant, and
the heat exchanger has at least one tube and part of each tube is inserted coaxially into a tube connector and can conduct coolant,
wherein
each tube has a circumferential stop protruding radially outward, and each tube connector has a circumferential stop that protrudes radially inward,
each tube bears axially at its stop against the stop on the tube connector into which it has been inserted,
the tube connector has four crimps on its rim where it bears radially against the tube, and the crimps are formed on each tube connector using the crimping tool according to claim 1, and
the stops on the tubes are axially enclosed at the crimps between the stops on the tube connectors and the rims of the tube connectors, thus forming connections to the heat exchanger through which coolant can be conducted.

5. The heat exchanger according to claim 4, wherein the stops on the tubes are formed by a circumferential collar that protrudes radially outward, and the stops in the tube connectors are formed by a circumferential ridge that protrudes radially inward.

6. The heat exchanger according to claim 4, wherein the heat exchanger has at least one ring seal, and each ring seal is adjacent to a stop on a tube and clamped radially, in a sealing manner, between the tube and tube connector on the side of the stop facing away from the rim of the tube connector.

7. The heat exchanger according to claim 4, wherein the heat exchanger has exactly two connections between exactly two tubes and exactly two tube connectors on the heat exchanger, wherein
the two tube connectors are placed on the heat exchanger block at a minimum distance between the central longitudinal axes thereof of 1.5 to 2.5 times, preferably twice the outer diameter of a tube section of the tube that is adjacent to the stop outside the tube connector, and/or
the two tube connectors are placed on the heat exchanger block (3) at a minimum spacing between the central longitudinal axes thereof in the longitudinal direction of the heat exchanger that is 1.5 to 2.5 times, preferably twice the outer diameter of a tube section of the tube that is adjacent to the stop outside the tube connector, and/or
the two tube connectors are placed on the heat exchanger block at a minimum spacing between the central longitudinal axes thereof in the lateral direction of the heat exchanger that is 0.5 to 1.5 times, preferably the same as the outer diameter of a tube section of the tube that is adjacent to the stop outside the tube connector.

8. A method for producing at least one connection between a tube and a tube connector through which coolant can be conducted, preferably a tube connector for a heat exchanger, using a crimping tool according to claim 1, wherein
the heat exchanger has at least one heat exchanger block through which coolant can be conducted,
the heat exchanger has at least one tube connector that has a central longitudinal axis and is permanently connected to the heat exchanger block and can conduct coolant, and
the heat exchanger has at least one tube and part of each tube is inserted coaxially into a tube connector and can conduct coolant,
wherein
each tube has a circumferential stop protruding radially outward, and each tube connector has a circumferential stop that protrudes radially inward,
each tube bears axially at its stop against the stop on the tube connector into which it has been inserted,
the tube connector has four crimps on its rim where it bears radially against the tube, and the crimps are formed on each tube connector using the crimping tool, and
the stops on the tubes are axially enclosed at the crimps between the stops on the tube connectors and the rims of the tube connectors, thus forming connections to the heat exchanger through which coolant can be conducted;

the method comprising temporarily holding the tube connector in the crimping tool (14) by a clamp in the crimping tool (14);

inserting the tube into the tube connector coaxially to the central longitudinal axis thereof, until the stop on the tube comes in axial contact with the stop on the tube connector;

forming four crimps with the crimping tool on the rim of the tube connector where it is radially adjacent to the tube; and wherein the stops on the tubes are axially enclosed at the crimps (9) between the stops on the tube connectors and the rims of the tube connectors, thus forming the connections through which coolant can be conducted.

9. The method according to claim 8, wherein prior to inserting the tubes into the tube connectors, a ring seal is placed on each tube between the stop and the end of the tube; and after inserting the tubes into the tube connectors, the ring seals (12) are located axially between the stops on the tube connectors and the ends of the tubes and clamped between the tubes and the tube connectors to form a radial seal.

10. The method according to claim 8, wherein exactly two connections are formed with the method between exactly two tubes and exactly two tube connectors, wherein the crimps on the two tube connectors are formed simultaneously with the crimping tool.

11. The heat exchanger according to claim 4 wherein a refrigerant flows through the heat exchanger, wherein the refrigerant is without per- and polyfluoroalkyl substances.

12. The heat exchanger according to claim 11, wherein the refrigerant is propane.

* * * * *